April 26, 1955  W. N. WILLIAMSON  2,707,068
POISON DISPENSER
Filed Nov. 13, 1951

INVENTOR.
Willis N. Williamson
BY
Stedman B Hoar
Agent.

United States Patent Office 2,707,068
Patented Apr. 26, 1955

2,707,068

POISON DISPENSER

Willis N. Williamson, Upland, Calif.

Application November 13, 1951, Serial No. 256,113

1 Claim. (Cl. 222—175)

This invention relates to instruments for dispensing measured quantities of powdery or granular materials, and more particularly relates to an instrument for placing poisoned grain in and around the holes of gophers and other animals.

A common method of dispensing poisoned grain is to proceed on foot with a bucket and a spoon. This method is slow; it involves much back bending and kneeling; the operator may easily get poison on his hands or clothes, or even have it blown in his mouth, nostrils and eyes. Yet the cost of poison and grain makes it uneconomical to spread the mixture, and experience has shown that lethal efficiency is greatest when the mixture is carefully placed in or at the entrance to a burrow. If placed precisely in the hole, the poison will not be scattered by wind, and the usual burrow mound will protect it from surface water. It is not necessary to place poison in every entrance of a burrow, as most burrowing animals customarily leave a burrow by a hole different from the one by which they entered, thus instinctively avoiding possible pursuers, and in time each member of a colony will use every hole leading in and out of the communal labyrinth. Therefore, it is possible to place poison efficiently over a large area by traversing the area on parallel paths and placing poison only in the holes lying in or close to the paths.

It is an object of this invention to provide a poison dispensing device which may be operated by a person walking erectly, or even riding a horse or an automobile or tractor.

A further object of the invention is to provide a poison dispenser which protects the operator from contact with the poisonous material.

Another object of the invention is to provide a poison dispenser which dispenses a measured amount of poisonous material at each operation, thus avoiding both waste and the inefficiency of excessive frugality.

In general terms, I attain the foregoing objects and other useful advantages by providing a covered container in which poison and grain may be mixed, a lever-operated measuring device at the outlet of the container, a tube connected to the measuring device and serving like a gun barrel to project the poison on an aimed course, and means for supporting the device in alignment with the forearm of the operator so that the device may be aimed like a pistol. The target being at ground level, discharge of the device may be by gravity.

In the accompanying drawing illustrative of a preferred embodiment of my invention, Fig. 1 is a side elevational view showing how my poison gun is aimed and discharged;

Fig. 2 is a fragmentary side elevation showing a modified form of discharge tube;

Fig. 3 is a transverse sectional view on the line 3—3 of Fig. 1 showing the discharge end of the container; and Fig. 4 is a fragmentary longitudinal sectional view on the line 4—4 of Fig. 3, showing the lever and measuring mechanism.

Having reference now to the details of the drawing, a container 10 has one end closed by a removable cap 11 and has a permanent bottom closure 12. Adjacent the bottom closure 12, a handle 13 extends laterally from the container in the manner that a pistol-grip extends from the barrel of a pistol. Adjacent the capped end 11 a band 14 encircles the container and forms a laterally extending loop or arm sling 15 aligned with the handle 13. As shown in Fig. 1, when an operator thrusts his hand through the arm sling 15 and grasps the handle 13, the container 10 will be held in substantial alignment with the operator's forearm. As the dispenser is intended for one-handed operation it is an advantage to have the arm-sling 15 of rigid material, rigidly secured to the container.

Mounted on the closure 12 is a cylinder 17, in communication with the interior of the container 10 by ports 18 and 19. A tube 20 forms a T with the cylinder 17, and extends in prolongation of the body of the container 10, communicating with the cylinder 17 through a port 21 offset from alignment with the ports 18 and 19. Within the cylinder 17 is a plunger 22 having a transverse bore 23 which may be moved into alignment with either the port 18 or the port 21, thus constituting a sliding valve between the ports. The plunger 22 is operated by a bell-crank lever 24 and a connecting rod 25. The lever 24 pivots on a pin 26 in a journal box 27 on the handle 13. One arm 28 of the lever 24 extends through a slot 29 in the handle 13 to its connection with the connecting rod 25. The other arm 30 of the lever 24 has a scissors action with respect to the handle 13, the arm 30 and handle 13 being gripped by one hand of the operator and squeezed together to advance the plunger 22. A spring 31 reacts between cylinder head 32 and plunger head 33 to retract the plunger 22. Retraction of the plunger 22 is limited by contact of the lever arm 28 with the end 34 of the slot 29 to a position in which the bore 23 is aligned with the ports 18 and 19. Advancement of the plunger 22 is limited by contact of the lever arm 30 with the handle 13 to a position in which the bore 23 is aligned with the port 21.

The tube 20 is adapted to receive different types of discharge nozzles which may be held therein by friction. In Fig. 1, a discharge nozzle 35 is shown, having a relatively short tubular extension 36 and a distributing baffle 37. The baffle 37 has a deflecting edge 38 inclined to the body of the baffle. This type of nozzle, is useful when poison is to be spread on the ground around a hole, as the baffle deflects the falling grain enough to cause the grain to spread. In Fig. 2, I have shown a straight extension tube 40 which may be long enough to direct the falling grain accurately when the operator is riding on a horse or in a vehicle.

The cap 11 may be secured to the container 10 by any suitable means, a lock or latch handle being shown at 41.

In operation, the container 10 is filled with materials constituting the poisoned bait, which may be mixed in the container by shaking after the cap 11 has been replaced. The operator places a suitable nozzle, such as the nozzle 35 or 40, upon the tube 20, according to the height from which he wishes to operate and the nature of the desired distribution. With the arm sling 15 around the operator's forearm and the handle 13 and lever arm 30 grasped in the operator's hand, aiming the dispenser becomes as easy and automatic as aiming a pistol. The rigid loop of the arm sling 15 permits the operator to relax his grip on the lever 30 and handle 13 to operate the lever, and yet maintain the dispenser in aimed position. With the tube 20 pointed downwardly, and the lever 30 released, a quantity of poisoned bait will enter the bore 23 through the ports 18 and 19, the quantity being measured by the capacity of the bore. With the tube 20 still pointed downwardly and the lever 30 pressed against the handle 13, the bore 23 is moved to alignment with the port 21 and tube 20, permitting the measured quantity of bait to descend by gravity through the dispensing nozzle.

It is to be understood that modifications of the specific showing herein made, coming within the scope of the appended claim, are to be considered as included within the spirit and scope of my invention.

I claim:

In a poison dispenser, the combination of a rigid unit comprising a container and a discharge tube communicating therewith, means for strapping said rigid unit to the forearm of a person with said discharge tube in substantial alignment with the forearm, handle means rigidly connected to said unit, trigger means adjacent said handle means, and means operable by said trigger means for delivering a measured quantity of granular material from said container to said discharge tube.

References Cited in the file of this patent

UNITED STATES PATENTS

| | | |
|---|---|---|
| 467,074 | Anderson et al. | Jan. 12, 1892 |
| 712,843 | Paul | Nov. 4, 1902 |
| 765,815 | Christen | July 26, 1904 |
| 778,515 | Trefny | Dec. 27, 1904 |
| 925,252 | Ingram | Mar. 15, 1910 |
| 1,002,150 | Henriquez | Aug. 29, 1911 |
| 1,314,951 | Drews | Sept. 2, 1919 |
| 1,340,127 | Welch | May 11, 1920 |
| 2,239,464 | Moger | Apr. 22, 1941 |
| 2,482,589 | Maguire | July 18, 1946 |